United States Patent [19]
Walker

[11] 3,971,119
[45] July 27, 1976

[54] MANUFACTURE OF RINGS COMPRISING SEPARABLE SEGMENTS

[75] Inventor: Gordon Richard Walker, Leamington Spa, England

[73] Assignee: Filton Limited, Leamington Spa, England

[22] Filed: Aug. 25, 1975

[21] Appl. No.: 607,263

[30] Foreign Application Priority Data
Aug. 27, 1974 United Kingdom............... 37431/74

[52] U.S. Cl............................... 29/416; 29/156.5 A; 29/558; 51/DIG. 7; 51/290; 51/323
[51] Int. Cl.²......................................... B23P 17/00
[58] Field of Search....... 29/416, 557, 558, 156.4 R, 29/413, 414, 156.5 A, 412, 415; 225/2, 5; 51/DIG. 7, DIG. 15, 290, 323

[56] References Cited
UNITED STATES PATENTS

| | | | |
|---|---|---|---|
| 2,553,935 | 5/1951 | Parks et al..................... | 29/156.5 A |
| 2,560,413 | 7/1951 | Carlson.......................... | 29/156.5 A |
| 3,285,098 | 11/1966 | Beveridge......................... | 29/413 X |
| 3,818,577 | 6/1974 | Bailey et al....................... | 29/416 X |

Primary Examiner—Victor A. DiPalma
Attorney, Agent, or Firm—Reed Smith Shaw & McClay

[57] ABSTRACT

A ring comprising separable segments especially for seating against a rotary seal and a method of manufacturing such a ring which comprises forming and assembling the segments into the ring, clamping the ring segments together, e.g. by bolts, forming at least one tapered passageway in the ring across each joint between mating segments and inserting a tapered pin into the tapered passageway to hold the segments against relative sliding movement before a finishing operation is performed on an end face or the bore of the ring so that such end face or bore can act as an effective rotary seal.

8 Claims, 7 Drawing Figures

MANUFACTURE OF RINGS COMPRISING SEPARABLE SEGMENTS

This invention relates to rings comprising separable segments and to their precision manufacture. The invention has particular reference to ring components of rotary shaft seals.

If a ring having dimensions or a face geometry conforming with precise specifications has to be composed of separate inter-connectable segments in order to enable or to facilitate installation of the ring in a particular machine or device, the segments can be bolted together in unfinished condition and machining or other finishing operations can then be performed in the same way as for a one-piece ring.

It has been found that for certain high-precision work this practice is unsatisfactory. Even if great care is taken in the drilling or drilling and tapping of the segments for receiving the connecting bolts it is not possible to ensure that the segments will always be in a precisely predetermined relationship when bolted together. The accuracy of registration which it is possible to ensure is high enough for certain purposes but circumstances arise in which even a minute departure from a precise predetermined mutual relationship of the segments must be avoided. An example is the manufacture of a sealing or seating ring for a rotary shaft seal assembly so that the ring segments form a true planar diametral sealing or seating face ensuring completely uniform load distribution over the face area.

The problem referred to occurs for example in the manufacture of a rotary union such as that of which a part is shown in FIG. 1 of the accompanying drawings. A heavy-duty shaft section 1 having welded end flanges such as 2 for bolting to other shaft sections, supports an annular casing 3 defining an air chamber 4 into which air under a high pressure is fed via an inlet 5 for delivery to a pneumatically operated mechanism via an air passage including a branch portion 6 extending radially into the shaft from the air chamber, and another portion (not shown) extending along the shaft. The casing 3 is supported by oil-lubricated white metal sleeve bearings 7, 8 and is axially located by thrust bearings such as 9. The air chamber 4 is sealed from the bearings and from atmosphere by two rotary sliding contact seals. Between the lefthand shaft bearing and the chamber 4 there is a rotary seal formed by a fixed carbon ring 10 and a contacting rotary metal ring 11. The carbon ring 10 is adhesively secured in a rebate of a carrier ring 12 bolted to the adjacent end wall of the annular casing 3. The rotary metal ring 11 is driven via axial pins such as 13 which are fast with the ring and extend with clearance through peripheral axial grooves in a central collar 14 which is secured to the shaft 1. The rotary sealing ring 11 is thus axially displaceable relative to the shaft, and this sealing ring is urged into contact with the carbon ring 10 by compressions springs such as 15. These springs extend through axial bores in the collar 14 and bear against the rotary ring 11 and a second rotary ring 16 which forms part of a second identical rotary shaft seal which seals the air chamber 4 from the right-hand shaft bearing 8. A packing ring 17 is accommodated in a groove in the inner face of the rotary sealing ring 11 and forms a gas-tight seal between such ring and the shaft.

In this particular machine assembly it is required that the rotary sliding contact seals be effective in the absence of an oil film between the sealing faces of the sealing rings. Therefore these faces must be truly planar in order to achieve a gas-tight seal. At the same time the various metal rings used in the assembly and whose preceise geometry is critical for ensuring that the rubbing contact faces of the rotary seals are truly planar and normal to the shaft axis, cannot be made in one piece because they could not be passed over the flanged ends of the shaft section.

The present invention provides a method of ring manufacture which solves the problem hereinbefore described and exemplified by reference to FIG. 1.

According to the present invention, there is provided a method of manufacturing a ring comprising separable segments, wherein the segments are formed and assembled to constitute the ring and are held together against relative displacement by tapered pins located in correspondingly tapered passageways formed across the joints between mating segments and a finishing operation is performed on at least one face of the ring common to all the segments while the segments are thus held and located by said pins.

It will hereafter be assumed that the ring comprises two segments, as is preferred, but it is within the scope of the invention for there to be more than two segments.

Preferably each said segment is formed with a connecting lug at each end and when the segments are assembled to form the ring such connecting lugs lies at symmetrically disposed zones of the ring.

It is preferred to form the or each tapered passageway across a joint between a pair of mating segments while the segments are clamped together. This clamping is preferably achieved by screw-threaded connectors as will be referred to below.

A preferred method of manufacture according to the invention comprises the following steps in the order in which they are referred to: A one-piece ring blank is formed by casting stamping or otherwise to a shape which includes peripheral projections disposed symmetrically around the blank for forming connecting lugs; the blank is split into segments each having a connecting lug at each end which is formed by a portion of a said projection; mating faces of the lugs are made true by machining or other finishing operation(s); each lug is drilled or drilled and tapped to enable the segments to be bolted together; while the segments are held assembled by bolts or other members penetrating such holes, the passageways for receiving the tapered pins are accurately formed in the pairs of mating lugs as by drilling, and rough and finish reaming; the tapered pins are inserted; and the critical face or faces common to the ring segments is or are formed by machining or otherwise while the segments are thus bolted and pinned together.

Preferably a finishing operation is performed on the bore of the ring while the segments are clamped together, e.g. to make such bore as truly cylindrical as is practicable.

It is also preferred feature to provide screw-threaded connecting means for clamping the segments together. This screw-threaded means may consist of or include screw-threaded sockets or male-threaded extensions of the tapering pins, and co-operating threaded components of male or female form as the case may be. Alternatively or in addition at least one tapered pin as aforesaid and at least one separate screw-threaded fastener may be used for each pair of mating lugs. Any such screw-threaded fastener may for example be a one piece fastener in the form of a bolt which makes threaded engagement with a tapped bore in one or each lug, or a two-part fastener comprising a bolt which traverses the mating lugs, and a co-operating nut.

The tapered pins and the receptive passageways are preferably of circular section.

The tapered pins are preferably provided with threaded portions as already referred to whereby such pins can be secured in position by co-operating threaded components against axial withdrawal.

The invention includes any ring which comprises segments held in register by tapered pins and which has been manufactured by a method according to the invention as hereinbefore defined.

The invention includes any ring comprising separable segments characterised in that the segments are held assembled together against relative displacement by means comprising tapered pins located in correspondingly tapered passageways formed across the joints between mating segments and in that at least one end face of the ring has rotational symmetry.

Preferably, such ring is constituted by two connected segments.

Preferably, each segment has a connecting lug at each end and in that such lugs lie at symmetrically disposed zones of the assembled ring.

The finishing operation on an end face of the ring may be such as to give that face any desired surface configuration which has rotational symmetry. For example such surface may be made as a diametrical plane normal to the ring axis. Alternatively the ring face may be stepped or conical if this is desired.

A particular ring and its method of manufacture will now be described by way of example with reference to FIGS. 2 to 7 of the accompanying drawings in which.

Figure 1:
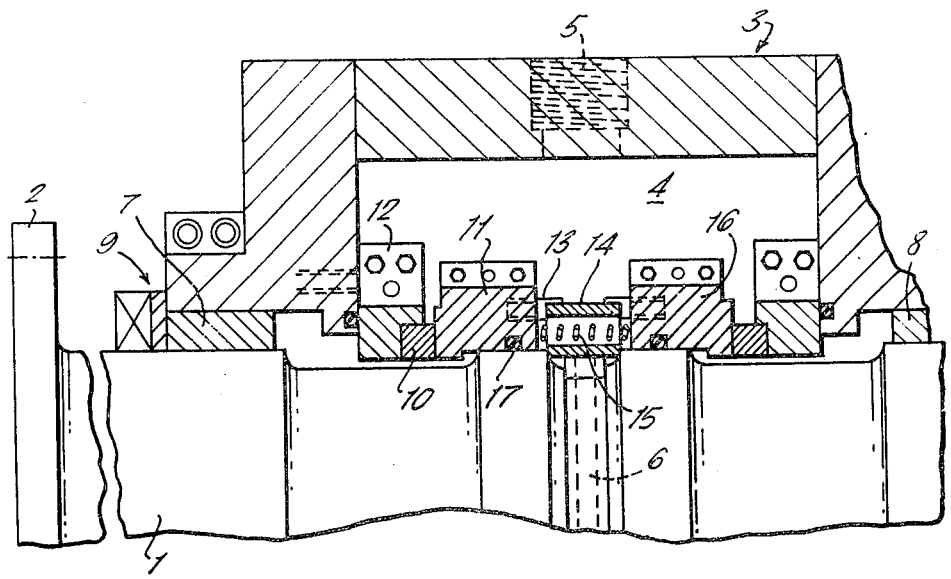

The ring 18 comprises two segments 19 and 20 which are held together by bolts at diametrically opposite zones. At the right-hand side of the ring in the aspect of FIG. 2 the segments are clamped together by two bolts 21 and 22 which extend through bores in a lug 23 on segment 20 and make screw-threaded engagement with tapped sockets in the mating lug 24 of the segment 19. The mating lugs are also traversed by a tapering pin 25 which is accommodated in a corresponding tapering bore extending across the joint between the lugs. The larger end of the pin is substantially flush with the corresponding face of the lug 23. At its narrower end the pin has an axial screw-threaded extension 26 which is engaged by a nut 27 whereby the pin is held against axial withdrawal. The lugs on the other side of the ring are clamped together and mutually located in the same way but it will be observed that the bolts and tapered pin at that opposite side of the ring are inverted with respect to the bolts and pin on the right-hand side.

The wider end portions of the pins may be provided with screw-threaded sockets for engagement by a suitable holding tool to facilitate withdrawal of the pins when it is required to disassemble the ring.

Figure 2:
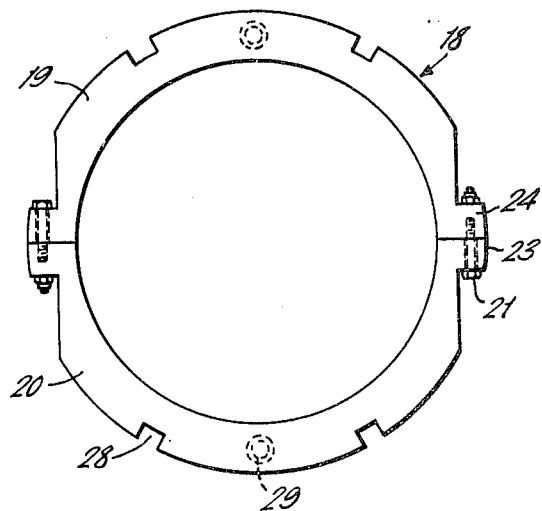
FIG. 2 is an elevation of the finished ring.

A ring blank may suitably be formed by casting a plain ring e.g. of rectangular cross section. Projections for forming the mating connecting lugs can be made by machining recesses into the ring as shown in FIG. 2.

Figure 4:
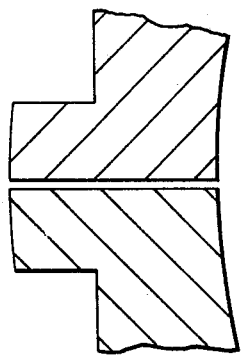
FIGS. 4 to 6 illustrate three different stages of the manufacturing operation.
Figure 5:
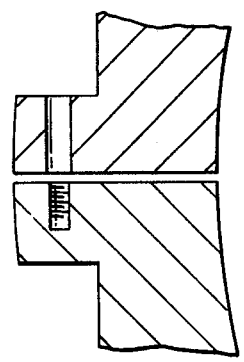
Figure 6:
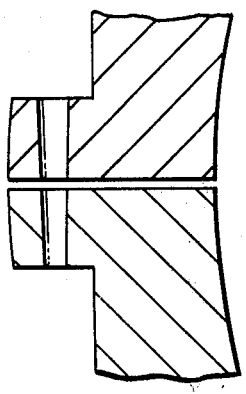

In the course of manufacturing such ring, after forming the ring blank, it is split into two segments with mating lugs (FIG. 4). After machining the mating faces of these lugs, the bolt holes and sockets are drilled and tapped (FIG. 5). While the segments are clamped together by the bolts the tapered bores for the pins are formed and finished (FIG. 6). Once the pins have been inserted and secured, the necessary finishing operations are carried out on the ring. These operations are required in order to provide the ring with at least one accurately formed end face, e.g. a planar diametral face, assuming that the ring is to form a sealing or seating ring of which the geometry of one or both of those faces is critical for sealing performance, and also to true the bore of the ring to take account of any material removed in splitting the blank and machining the mating faces of the lugs.

Peripheral grooves such as 28 (FIG. 2) are formed in the ring to facilitate mounting of the ring segments for example in the assembly of FIG. 1. The grooves are arranged to receive parts of a clamping device which holds the ring segments in position while the tapered pins and clamping bolts are fastened. Threaded holes 29 may also be provided, e.g. for the reception of axial pins such as 13 (FIG. 1).

Figure 3:
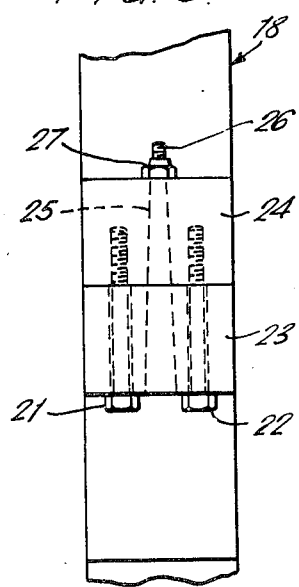
FIG. 3 is a view at right-angles to FIG. 2 of one of the ring segment joints.
Figure 7:
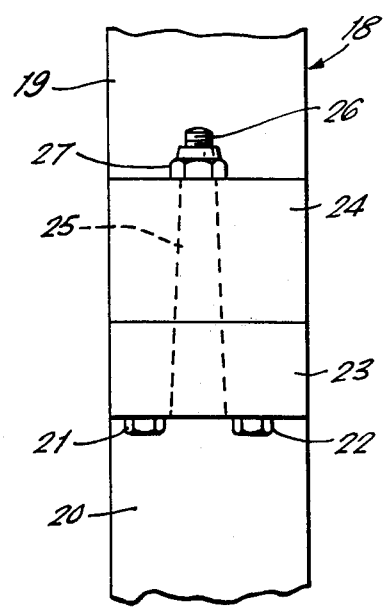
FIG. 7 is a view corresponding to FIG. 3 of a variant embodiment.

FIG. 7 shows a detail corresponding to FIG. 3 of a variant embodiment, and in FIG. 7, like parts are given the same reference numerals. It will be noted in particular that the lug 23 against which the heads of the bolts 21, 22 bear is somewhat thinner than its mating lug 24. This difference in thickness is found convenient for forming the holes for the bolts and for the tapered pins.

It will also be noted in FIG. 7 that the bolts and tapered pins are offset towards the left of the drawing. In some finishing operations it is desired to remove material only from one end face of the ring, or to remove more material from one end face than from the other, and this is facilitated if the segment connecting elements are offset.

The method of manufacture according to the invention can be used for example in the fabrication of the rings 11, 12 and 16 of an assembly as shown in FIG. 1, and also in the manufacture of the end walls of the casing 3. The carbon rings of that assembly can be made in segments which are sealed together in situ, e.g. by means of a sealing medium based on polytetrafluoroethylene. The carbon rings can be bonded to their carrier rings 12 by a suitable resin-based adhesive as known per se.

While the invention has been described more particularly for use when it is required to provide a ring with an accurate diametral face, the method can also be used with advantage in the fabrication of a ring having an inner face which is critical. Such an inner face can also be accurately formed while the segments are clamped together and held against relative sliding motion by means of tapered pins.

I claim:

1. A method of manufacturing a ring comprising separable segments, with the improvement that said segments are formed and assembled to constitute the ring and are held together against relative displacement by tapered pins located in correspondingly tapered passageways formed across the joints between mating segments and a finishing operation is performed on at least one face of the ring common to all the segments while the segments are thus held and located by said pins.

2. A method according to claim 1, wherein each said segment is formed with a connecting lug at each end and when the segments are assembled to form the ring such connecting lugs lie at symmetrically disposed zones of the ring.

3. A method according to claim 1, wherein at least one tapered passageway across a joint between a pair of mating segments is formed while such segments are clamped together.

4. A method according to claim 3, wherein a one-piece ring blank is formed to a shape which includes peripheral projections disposed symmetrically about the blank for forming connecting lugs, the blank is split into segments each having a connecting lug at each end which is formed by a portion of a said projection, mating faces of said lugs are made true, holes are formed across the joints between mating lugs, the segments are held together by members penetrating such holes to form a ring, tapered passageways are formed across the joints between mating lugs and the tapered pins are inserted, and a finishing operation is performed on at least one face of the ring common to all the segments.

5. A method according to claim 4, wherein a finishing operation is performed on an end face of the ring while the segments are held together by said tapered pins.

6. A method according to claim 4, wherein a finishing operation is performed on the bore of the ring while the segments are held together by said tapered pins.

7. A method according to claim 4, wherein there are two said ring segments which define said ring.

8. A method according to claim 4, wherein said ring segments are clamped together by screw-threaded connecting means.

* * * * *